March 25, 1969

B. OWENS 3,434,493

FLOW-SENSITIVE SHUTOFF VALVE

Filed Sept. 18, 1967

BOBBY OWENS
INVENTOR

BY *H.C. Goldwire*

AGENT

United States Patent Office 3,434,493
Patented Mar. 25, 1969

3,434,493
FLOW-SENSITIVE SHUTOFF VALVE
Bobby Owens, Sulphur Springs, Tex., assignor to LTV Electrosystems, Inc., Greenville, Tex., a corporation of Delaware
Filed Sept. 18, 1967, Ser. No. 668,512
Int. Cl. F16k *17/20*
U.S. Cl. 137—460                                                6 Claims

ABSTRACT OF THE DISCLOSURE

This invention provides a shutoff valve which is held in its open position by a detent during normal flow through the valve, but which responds to a small increase above a normal flow-rate by overriding the detent and shutting off the flow. A second detent holds the valve in its open position until manually overriden.

---

This invention relates to devices for the automatic stopping of fluid flow upon the occurrence of a leak in a fluid system, and more particularly to a flow-sensitive shutoff valve operable for stopping fluid flow to a downstream section of a fluid system upon the occurrence of even a slight leak in the section.

The isolation of sections of fluid systems by automatic shutoff valves to prevent total failure of a system upon a rupture occurring in one of its sections is well-known in the art. Typical applications of such valves are in automobile braking systems (where the failure of one hydraulic brake line might cause a total brake failure), in gas-supply lines, and in aircraft hydraulic systems. Such a shutoff valve normally incorporates a restrictive passageway which allows the flow of fluid at desired normal rates but restricts sudden flow surges through the valve such as occur upon the rupture of a conduit downstream from the valve. The restrictive passageway produces an undesirably great degree of frictional resistance to fluid flow through the valve during normal operation of the fluid system and thus causes a continuous loss of efficiency within the system. In addition, such a valve normally has a piston or equivalent means moveable for closing the valve when a loss of pressure occurs upon rupture of a conduit downstream from the valve. The shutoff valve is normally installed between a pump and a downstream section of the fluid system, the downstream section being potentially subject to ruptures and offering a frictional resistance to fluid flow which produces a degree of "back pressure" to the pressure supply source. Upon a major rupture occurring in the downstream section, the resistance to flow is suddenly reduced and the resulting decrease of pressure downstream from the shutoff valve produces a pressure differential across the shutoff valve piston which induces the pitson to move to its closed position. While such valves are normally reliable for stopping fluid flow in the case of major leaks in the downstream section, a minor leak (one which does not allow the escape of a substantial portion of the fluid flow from the system) may not produce the severe loss of downstream pressure required to effect shutting of the valve by the piston; yet, such a minor leak may allow a gradual loss of fluid which will result in total failure of the system. The escape of fluid through such a minor leak results in a slightly higher flow-rate through the shutoff valve, but previous shutoff valves have not been capable of responding to such mere increases in flow-rate without corresponding, severe downstream pressure-drops.

Responsive only to large, downstream losses of fluid, and upon having become closed in response thereto, previous valves of the above-mentioned character have the further disadvantage of requiring difficult and time-consuming adjustments for re-setting the valve to again allow free fluid flow. For example, some designs for shutoff valves require, in re-establishment of free flow, the opening of a valve housing for adjustment of internal mechanisms, and the painstaking bleeding of air from lines is sometimes required. Such valves do not incorporate controls by which fluid flow may be stopped or re-started at will; thus, a separate cutoff valve is required for each section of a fluid system if such independent control of fluid flow is desired. The valves have the further disadavntage of being undesirably complex and expensive to produce.

It is, accordingly, a major object of the present invention to provide a new and improved shutoff valve.

A further object of the present invention is to provide a shutoff valve for stopping fluid flow upon the flow exceeding a predetermined flow-rate.

A related object is to provide a shutoff valve for stopping fluid flow upon the occurrence of either substantial or minor leaks in a fluid system portion downstream from the valve.

Another object is to provide a shutoff valve which, after stopping fluid flow, may be quickly and easily re-set to allow fluid flow.

Still another object is to provide an automatic shutoff valve which can also be manually operated.

An additional object is to provide a shutoff valve which, when in its open position, offers little frictional resistance to fluid flow therethrough.

Yet another object is to provide a shutoff valve providing the above stated advantages which nonetheless can be simply and inexpensively constructed.

Other objects and advantages will be apparent from the specification and claims and from the accompanying drawing illustrative of the invention.

Figure 1:
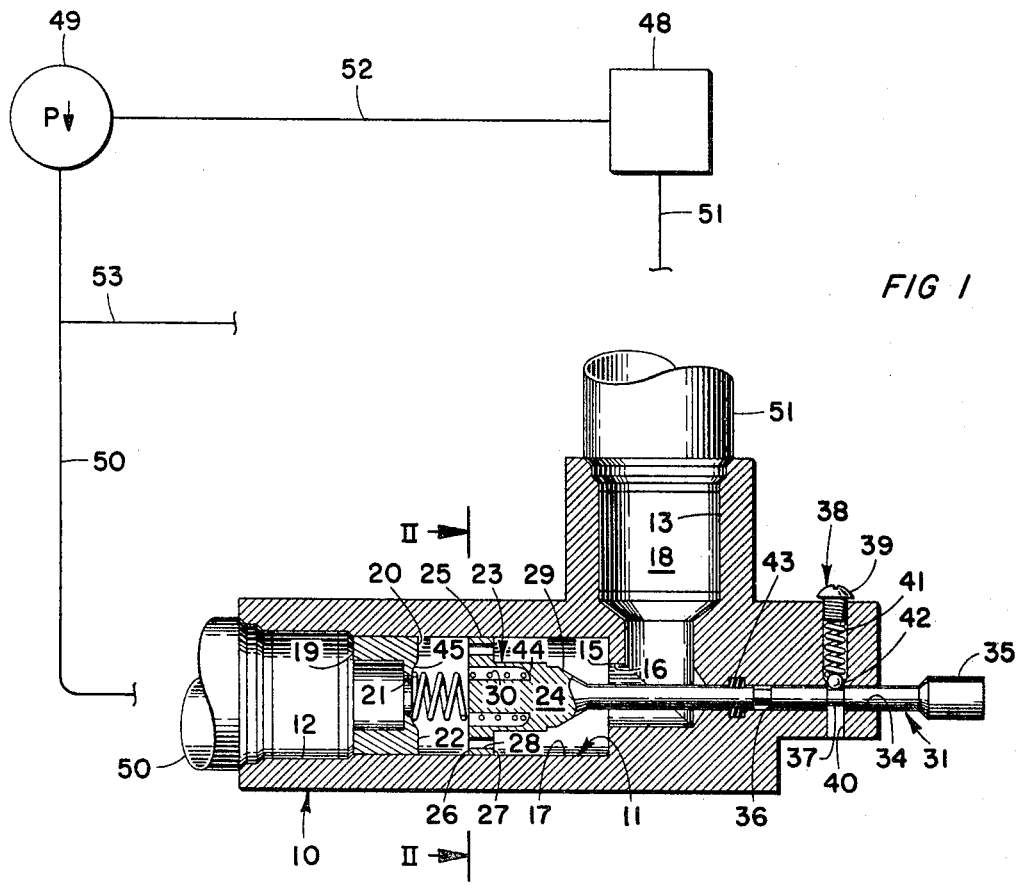
FIGURE 1 is a longitudinal, sectional view of a preferred embodiment of the shutoff valve showing schematically a pump and load associated with the valve.

Referring to FIGURE 1, although the shutoff valve is not limited to use in a particular fluid system, it is shown, for illustrative purposes, in a simple, closed, fluid system comprising a pump 49 with pressure conduit 50, the shutoff valve (identified by its housing 10), and a section 48 of the fluid system connected to the valve by a conduit 51 and to the pump by a return conduit 52. It is desired to isolate the section 48, upon a leak occurring therein, from the pressure conduit 50. The section 48 offers a frictional resistance to fluid flow therethrough and is hereinafter termed the load section 48. By way of example, the valve has been successfully used in an illuminating system (not shown) supported by an aircraft at a suitable altitude over a ground area desired to be illuminated and employing a plurality of fragile, lamp-cooling envelopes through which a cooling fluid is continuously circulated, the envelopes being arranged in parallel and with a valve of the present design installed between each envelope and an upstream fluid source. Should one of the envelopes (equivalent to the load section 48 in FIGURE 1) be broken, the valve between it and the fluid source cuts off the flow to the envelope, thus preventing a total loss of fluid from the system through the leak. Conduit 50 is shown as having a branch 53 to provide a schematic showing of means for conducting fluid from pump 49 to another load section such as shown at 48. As many load sections as desired may be employed, and each may be isolated (in event of its rupture) by a respective valve (such as the valve illustrated) connected between it and the pump 49 in the manner shown.

Figure 2:
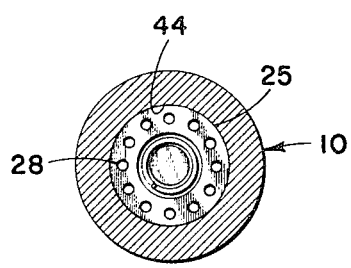
FIGURE 2 is a cross-sectional view of the shutoff valve, taken as at line II—II of FIGURE 1.

The shutoff valve comprises a housing 10 having a channel 11 therethrough, the housing having an inlet port 12 and an outlet port 13 providing communication between its exterior and the channel and further having an inwardly extending, annular flange formed between the inlet port and the outlet port and defining a valve seat 15 having an opening 16 therethrough. In the preferred embodiment shown in FIGURE 1, the channel 11 is L shaped and has a horizontal section 17 with an axis extending along the longitudinal axis of the housing 10 and a vertical section 18 which is approximately perpendicular to the horizontal section, the horizontal section extending from the inlet port 12 to the annular flange 14. An orifice cup 19 is mounted in the channel 11 between the inlet port 12 and the valve seat 15 and is slideable along the axis of the horizontal section 17 of the channel. The cup 19 has a rear face 20 facing toward the valve seat 15 and a centrally disposed orifice 21 which extends through the cup rear face 20 and along the axis of the horizontal section 17 of the channel 11, the orifice defining a flowway through the cup and continuous with the channel 11. The rear face 20 has formed thereon an annular boss 22 of a configuration to be described. A poppet member 23 is slideably mounted in the channel 11 between the cup 19 and the valve seat 15 and outlet port 13. The poppet member 23 has formed thereon a head 24 having a circumferential, outwardly extending flange 25 having front and rear faces 26, 27, the front face confronting the cup 19 and the rear face confronting the seat 15. The flange 25 has formed therein a plurality of bores 28 which communicate with the flange front and rear faces 26, 27. With added reference to FIGURE 2, the bores 28 are preferably disposed in an annular array. The flange 25 is slideable relative to the channel 11 and is positioned between the orifice cup 19 and the valve seat 15. The flange front face 26 and the orifice cup boss 22 are of configurations, relative to each other, such that the flange bores 28 are completely covered and substantially closed by the boss 22 upon the boss being in contact with the flange 25, the cup rear face 20 and cup boss being positioned to confront the poppet member head 24 and head flange 25 and slideable into contact with the flange. Upon the orifice cup 19 being spaced from the flange front face 26, as shown in FIGURE 1, a continuous flowway extends axially of the channel 11 through the orifice cup 19, the orifice 21, the flange bores 28, and the opening 16 in the valve seat 15.

The orifice cup 19 and/or the poppet member flange 25 are in substantially sealed relationship to the housing 10 such that, upon fluid flowing through the valve, leakage around the cup and flange within the channel 11 will be relatively much smaller than the flow through the orifice 21 and bores 28. However, the cup 19 and/or flange 25 need not be completely sealed, relative to the housing 10.

The poppet member head 24 has a valve face 29 confronting and corresponding to the valve seat 15 such that, upon the poppet member 23 moving to a position in which it contacts the valve seat 15, the valve face is in sealing engagement with the valve seat. A resilient means, such as a coiled spring 30, urges the orifice cup 19 away from the poppet member 23 and is mounted between and footed against both the orifice cup 19 and the poppet member head 24. The spring 30 is of a particular, predetermined strength, as will be described below. The poppet member head 24 is provided with a recessed, annular seat 44 in which the spring 30 is footed. An inner, annular bevel 45 is formed on the orifice cup 19 and extends from the boss 22 toward the orifice 21, the bevel being adapted to position the spring 30 centrally within the boss. The poppet member 23 has formed thereon a valve stem 31 which extends from the valve face 29 through the valve seat opening 16 and through a bore 34 formed through the housing 10 along the axis of the horizontal section 17 of the channel 11. The valve stem 32 has a first end attached to the poppet member 23 and a second end extending exteriorly of the housing and having a handle 35 formed thereon. First and second, mutually spaced grooves 36, 37 are circumferentially formed on the stem 31. A seal 43 provided in the housing bore 34 slideably encircles the stem 31, the seal being positioned between a detent mechanism 38 (to be described) and the channel 11 and serving to prevent the escape of fluid between the stem 31 and bore 34. The seal 43 preferably is positioned such that, upon the second groove 37 being in register with the detent mechanism, the first groove 36 remains between the seal and the detent mechanism and is not contacted or worn by the grooves 37, 37 during normal valve operation.

The detent mechanism 38 is mounted in a bore 40 which is formed in the housing 10 in a position in which it intersects and is perpendicular to the valve stem 31 and bore 34, the detent mechanism comprising a screw 39 extending from and having threaded engagement within the housing, a coiled spring 41 mounted in the bore 40 between the screw and the bore 34, and a latching tip 42 formed in the shape of a ball suitable for engaging the stem grooves 36, 37 and mounted in the bore 40 between the spring and the valve stem 31. The detent mechanism 38 and latching tip 42 are positioned relative to the valve seat 15 and stem 31 such that when the first valve stem groove 36 confronts and is engaged by the latching tip 42, the valve face 29 is in sealing engagement with the valve seat, and when the second valve stem groove 37 confronts the latching tip, the valve face is spaced from the valve seat. The valve stem 31 must thus be of sufficient length to extend past the opening 16, seal 43, and detent mechanism 38 and outside the housing 10 when the latching tip 42 engages the outermost groove 40; and this extension preferably is sufficient to enable the handle 35 to be formed on the stem.

The shutoff valve is thus of simple design; yet, in operation, it achieves positive stoppage of fluid flow at a precise, predetermined flow-rate. Fluid under pressure from the pump 49 flows through the conduit 50 to the shutoff valve inlet port 12 and continues therefrom along the channel 11 and successively through the orifice cup 19 and its orifice 21, the bores 28 in the flange 25, the opening 16 in the valve seat 15, the vertical section 18 of the channel 11, and the outlet port 13. From the outlet port 13, the fluid passes through the conduit 51 to the load section 48, the load section offering frictional resistance to fluid flow therethrough, and the fluid continuing through conduit 52 to the pump 49.

Upon a leak occurring in the load section 48, fluid escaping from the load section through the leak results in an increase in flow-rate through the valve. The rupture or leak acts to create, in effect, a flowway which is in parallel with the portion of the load section 48 which is downstream from the leak; and this additional outlet or flowway reduces the total resistance to fluid flow in the system, thus allowing an increased rate of flow upstream from the leak. The load section 48 is described as offering frictional resistance to fluid flow therethrough since it is the decrease in resistance to flow, caused by a leak, which allows the increase in flow-rate, which increase in turn causes closing of the valve, as will be described. Further, a leak in conduit 51 causes closing of the valve in the same manner as does a leak in the load section. The load section 48 is described as offering resistance to fluid flow, therefore, to illustrate how a leak downstream of the valve causes closing of the valve by reducing resistance to fluid flow. The compressed spring 30 continuously urges the orifice cup 19 away from the poppet member 23 by exerting a force on the orifice cup directed toward the inlet port 12, the spring being of a strength sufficient to maintain the orifice cup in spaced relation to the poppet member while the orifice cup is acted upon by the opposing force produced by a normal flow of fluid through and against the cup from the inlet port. The force produced by the fluid upon the cup 19 is chiefly a frictionally induced force caused by fluid flowing through the orifice 21 and orifice cup 19 rather than primarily one of fluid pressure; for pressures upstream and downstream of the cup 19, during normal flow, tend largely to equalize through the orifice 21. Upon an increase in flow-rate occurring through the valve because of a downstream leak, the forces against the orifice cup 19 and directioned toward the poppet member 23 (including the frictionally induced force caused by fluid flowing through the orifice 21 and orifice cup 19 and the inertial force of fluid flowing against the cup 19 in a downstream direction) increase and become greater than the opposing force of the spring 30 urging the cup 19 away from the poppet member 23. The net force exerted on the orifice cup 19 is then directed toward the poppet member 23, and the cup 19 thus moves toward the poppet member 23, thereby compressing the spring 30 further and bringing the orifice cup 19 into a position adjacent, but not initially contacting, the poppet member 23; whereupon, fluid flowing from the orifice 21 to the flange bores 28 must move radially and perpendicularly with respect to the axis of the horizontal section 17 of the channel 11. As the orifice cup 19 approaches the poppet member 23, the spacing between the annular boss 22 of the cup 19 and the front face 26 of the flange 25 decreases, and the fluid flowing from the orifice 21 to the flange bores 28 must flow at an increased velocity through the narrow space. According to the Bernoulli principle (summarily, where the velocity of a fluid increases, the pressure drops; and where the velocity of a fluid decreases, the pressure rises) the pressure of the fluid flowing at an increased rate in the narrowing space between the boss 22 and the front face 26 decreases with respect to the pressure of fluid in the channel 11 between the inlet port 12 and the orifice 21, where fluid moves through a larger cross-sectional area and thus at a lower velocity. Upon the pressure between the cup boss 22 and the flange 25 decreasing, the pressure upon the portions of the cup 19 directioned oppositely from the boss is greater than the pressure upon the cup rear face 20, and this pressure differential creates an unbalanced force upon the cup urging it toward the poppet member 23. As the cup 19 is moved toward the poppet member 23 and the spacing between the boss 22 and the flange 25 decreases further, the net force urging the cup toward the poppet member 23 further increases, and the cup is quickly moved into a position in which the boss 22 contacts the flange 25 and covers the bores 28. Upon the boss 22 covering the bores 28, substantially all fluid flow through the bores is suddenly cut off, whereupon the inertial forces of the fluid upstream from the orifice cup 19 and of the cup itself, both moving toward the poppet member 23, in addition to the fluid pressure produced by the pump 49, act against the cup and the poppet member and strongly urge them toward the valve seat 15. The sharp force of the fluid and the cup 19 upon the poppet member 23 is sufficient to overcome resistance to movement of the poppet member caused by the latching action of the latching tip 42 within the valve stem second groove 37, and the cup 19 and poppet member 33 quickly move toward the valve seat 15 and cause the valve face 29 to come into sealing engagement with the valve seat 15, thus cutting off all flow through the valve. Upon the poppet member 23 moving into a position in which the valve face 29 is in contact with the valve seat 15, the valve stem 31 is in a position in which the first groove 36 is in register with the latching tip 42, whereupon the latching tip engages the first groove and the detent mechanism 38 acts to restrain the poppet member 23 in its position of sealing engagement with the valve seat 15 and thus prevent any further leakage of fluid through the valve. Although the action of the orifice cup 19 has been described in terms of successive increments of movement, it should be understood that, in actual operation, the cup moves toward the poppet member 23 in a continuous motion until it contacts the poppet member.

Upon fluid flow through the valve being stopped by the poppet member 23 at the valve seat 15, the forces upon the orifice cup 19 urging it toward the poppet member 23 are substantially reduced. Frictionally induced force on the orifice cup 19 caused by the flow of fluid through the orifice 21 is eliminated. The force upon the cup 19 and directed toward the poppet member 23 caused by the Bernoulli effect, as previously described, is stopped, since the Bernoulli effect depends upon flow of fluid between the cup 19 and the poppet member 23. Fluid pressures upstream and downstream of the cup 19 and upstream of the valve seat 15 tend to equalize, since the cup 19 is provided with the orifice 21. Upon the reduction of forces urging the cup 19 toward the poppet member 23, the compressed, coiled spring 30 moves the orifice cup 19 away from the poppet member 23, and the valve seat opening 16 remains closed by the poppet member 23.

In its normal usage, the valve is left in its closed position (in which the poppet member 23 is sealingly engaged with the valve seat 15) until the downstream leak is repaired. The pump 49 is normally shut off while the leak is repaired. The valve then can easily be re-set to allow further flow of fluid therethrough by simply pushing the handle 35 with a force directed inwardly toward the poppet member head 24 and of sufficient strength to overcome the restraining action of the detent mechanism 38 against the first groove 36. The handle 35 is pushed inwardly until the second groove 37 is moved into register with the detent mechanism 38, whereupon the latching tip 42 again engages the second groove and restrains the poppet member head 24 in an open position wherein it is in spaced relation to the valve seat 15, thereby opening the flowway through the seat opening 16. The pump 49 is then re-started, and fluid flow through the valve is allowed to increase to a desired, normal flow-rate below the predetermined shutoff rate. As the poppet member 23 is moved to an open position, the spring 30 continues to urge the cup 19 away from the poppet member 23; thus, the cup 19 is pushed toward the inlet port 12 by combined action of the poppet member 23 and spring 30 when the poppet member itself is pushed to an open position, and the cup thus remains spaced from the flange 25 and flange bores 28.

A chief function of the detent mechanism 38 is to engage the valve stem groove 37 and restrain the poppet member 23 from moving against the valve seat 15 when the poppet member is acted upon by the frictional and inertial forces produced by fluid flowing against the poppet member and through its flange bores 28 at normal and desired flow rates, but to yield and allow the poppet member to move to a closed position (where it is in sealing engagement with the valve seat 15) upon the poppet member bores 28 being closed by the orifice cup 19. If this restraining force of the detent mechanism 38 were insufficient, the poppet member 23 could become unlatched and moved toward the valve seat 15 under the force of normal fluid flow through the channel 11. If the restraining force were too great, however, the poppet member 23 might resist even the large forces imposed upon it by the orifice cup 19 upon a downstream leak occurring. The detent mechanism 38 is adjusted by rotating the screw 39 to vary the degree of compression of the spring 41 within the shaft 40. Rotation of the screw 39 to compress the spring 41 causes the latching tip 42 to be urged toward the stem grooves 36, 37 with greater force and provides a greater resistance to any force on the poppet member 23 tending to move it from a latched position. Thus, by varying the spring tension of the detent mechanism 38, the valve may be adjusted for use with fluid systems of various, normal operating pressures. The adjustment of the detent mechanism 38 is not difficult or critical, however, in that the very considerable increment of force imposed upon the poppet member 23 upon closure of its bores 28 by the orifice cup 19 easily overcomes the latching action of the detent mechanism 38 over a wide range of pressures within a fluid system and of settings of the detent mechanism.

In the present design, the poppet member 23 is not only movable to an open position by manually pushing the stem 31 toward the inlet port 12 with a force applied to the handle 35 sufficient to disengage the detent mechanism 38 and continuing until the stem second groove 37 is engaged by the detent mechanism; the poppet member 23 further is moveable manually to a closed position by reversing the above procedure and pulling the handle 35 until the first groove 36 is engaged by the detent mechanism. In systems of high normal fluid pressures, it is desirable to shut off the pump 49 before moving the poppet member 23 to an open position since fluid pressure exerted against poppet member head 24 imposes a force on the head which urges it to remain in contact with the valve seat 15. A significant advantage is thereby provided in that fluid flow through the valve may be conveniently stopped or started as desired without the use of an additional shutoff valve.

The use of the orifice cup 19 to actuate closing of the valve by the poppet member 23 is a major factor in the improved performance of the valve. At flow rates less than the predetermined rate at which valve cutoff is desired, fluid flows through the channel 11, the orifice 21, and the multiple flange bores 28 with less frictional resistance than occurs in previous valves. This is because, in previous valves, fluid is required to pass through a small, restrictive orifice or to act against other restrictive devices such as heavy springs; in the present invention, the multiple bores 28 act in parallel to provide a large total cross-sectional area of flowway, and the cup orifice 21, valve seat opening 16, and channel 11 are also of substantial areas. Further, notwithstanding the low resistance to flow achieved by this construction, reliability of the valve in acting to stop fluid flow at a precise flow-rate has not been sacrificed; rather, the use of the orifice cup 19 as an actuating means and the effect of the Bernoulli principle upon the orifice cup 19 serve to achieve an even more reliable and precise response than has previously been possible. The spring 30 is of the precise strength needed to yield in response to the force which the orifice cup 19, assisted by the Bernoulli effect, will exert against the spring 30 upon the fluid flow through the channel 11 reaching the predetermined rate. The spring 30 need not be made much stronger or heavier (and accordingly, less precisely responsive to small increases in flow rate) in order to prevent undesired actuation of the valve upon occasional pressure surges occurring in the system which are not related to a downstream leak and do not produce increases of flow rate over the predetermined rate, since the orifice cup 19 actuating means acts primarily in response to flow increases rather than pressure variations, as previously discussed. The predetermined rate should be greater than the normal operational flow rate by a small safety factor to ensure that the valve will not be actuated by a very slight increase in flow over the normal rate. However, once the predetermined rate of flow has been reached, the Bernoulli effect causes the cup 19 to effect closing of the valve positively and very quickly, so that little fluid is lost. The valve has been demonstrated to be capable of consistently responding to increases in flow rate of only 10 percent over a normal rate of flow. By the use of an appropriately sized orifice 21 and spring 30, the cup 19 may be adapted for yielding at various flow rates as desired under various conditions. A larger orifice 21 offers less resistance to fluid flow therethrough, so that a higher flow rate is required to create sufficient frictionally induced force against the orifice cup 19 to overcome the opposing force caused by a spring 30 of a given size. For example, upon increasing the cup orifice 21 size and/or the strength of the spring 30, a greater flow rate is required to effect movement of the cup 19 against the action of the spring 30; by decreasing the orifice 21 size and/or the strength of the spring 30, a lower flow rate effects movement of the cup.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:
1. A valve for stopping fluid flow upon the flow exceeding a predetermined flow rate, comprising:
   a housing having therethrough a channel with an inlet port and an outlet port;
   cup means slidably mounted in the channel for actuating closing of the valve upon fluid flow through the channel exceeding a predetermined rate;
   poppet means mounted in the channel between the cup means and the outlet port for closing the valve upon the poppet means being actuated by the cup means, the cup means being movable relative to the poppet means;
   resilient means mounted between the cup means and poppet means for preventing the actuating action of the cup means upon fluid flow through the channel remaining at less than the predetermined flow rate; and
   means for re-setting the valve to allow fluid flow therethrough and having a first end extending within the housing to the poppet means and a second end extending from the housing.

2. An apparatus for stopping fluid flow upon the flow exceeding a predetermined rate, comprising:
   a housing having therethrough a channel with an inlet port, an outlet port, and an axis;
   a cup mounted in the channel for sliding along the axis thereof and having therethrough an orifice extending axially of the channel;
   a valve seat in the channel between the cup and outlet ports;
   a poppet member slidably mounted in the channel between the seat and cup and moveable into sealing engagement with the seat;
   means for normally holding the poppet member spaced from the seat and for yielding to allow the poppet member to move into sealing engagement with the seat; and
   means resiliently urging the cup away from the poppet member with a force sufficient to overcome opposing forces against the cup produced by fluid flow through the channel at a flow rate less than a predetermined value.

3. The apparatus claimed in claim 2, the poppet member having a front face provided with a plurality of openings therethrough which are disposed in a configuration relative to the structure of the cup such that the openings are covered by the cup upon the cup being in contact with the front face and such that, upon the cup being spaced from the front face, a continuous flowway is formed which extends through the openings and axially of the channel.

4. The apparatus recited in claim 2, the means for normally holding the poppet member spaced from the seat and for yielding to allow the poppet member to move into sealing engagement with the seat comprising a detent latching mechanism mounted in the housing adjacent the poppet member and adapted to normally constrain the poppet member in spaced relation to the seat, but upon the poppet member moving to a position adjacent the seat, to constrain the poppet member in sealing engagement with the seat.

5. The valve claimed in claim 2, the valve stem extending from the housing having a handle formed on the stem exteriorly of the housing.

6. A valve for stopping fluid flow therethrough upon the flow exceeding a predetermined rate, comprising:
   a housing having a channel therethrough, the channel having an inwardly extending, annular flange which defines a valve seat having an opening, the channel having an inlet port and an outlet port;

a poppet member mounted in the channel and having a head with a circumferential, outwardly extending flange having front and rear faces, the flange being slideably positioned in the channel between the inlet port and the valve seat, a plurality of bores being formed through the flange and communicating with the front and rear faces of the flange, the head having a valve face of configuration complementary to and confronting the valve seat, the poppet member having a valve stem extending from the valve face and through the opening in the valve seat, the valve stem having formed circumferentially thereon first and second, mutually spaced grooves;

a detent mechanism mounted in the housing and disposed adjacent the valve stem, the housing having a seal slideably encircling the stem and positioned between the detent mechanism and the channel, the detent mechanism having a latching tip positioned relative to the valve seat and stem so that when the first valve stem groove is adjacent the tip, the valve face is in sealing engagement with the valve seat and, when the second stem groove is adjacent the tip, the valve face is spaced from the valve seat, the valve stem having sufficient length to extend past the detent mechanism and from the housing;

an orifice cup slideably mounted in the channel between the poppet member and the inlet port, the cup having a centrally disposed orifice therethrough defining a flowway through the cup continuous with the channel, the cup having a rear face confronting the poppet member head, the face having a boss which is of a configuration corresponding to that of the front face of the outwardly extending flange on the head of the poppet member such that the flange bores are completely covered by the boss upon the orifice cup being in contact with the poppet member; and resilient means mounted between the orifice cup and the poppet member and having one end footed against the cup and another end footed against the member.

References Cited
UNITED STATES PATENTS

| 2,411,392 | 11/1946 | Saville | 137—498 |
| 2,700,982 | 2/1955 | Fuentes | 137—460 |
| 3,335,711 | 8/1967 | Roorda | 137—460 |

HAROLD W. WEAKLEY, *Primary Examiner.*

U.S. Cl. X.R.

137—498, 504